(12) United States Patent
Sakai et al.

(10) Patent No.: US 11,427,477 B2
(45) Date of Patent: Aug. 30, 2022

(54) SOLID ELECTROLYTE MATERIAL AND BATTERY

(71) Applicant: Panasonic Intellectual Property Management Co., Ltd., Osaka (JP)

(72) Inventors: Akihiro Sakai, Nara (JP); Tetsuya Asano, Nara (JP); Masashi Sakaida, Hyogo (JP); Yusuke Nishio, Osaka (JP); Akinobu Miyazaki, Osaka (JP); Shinya Hasegawa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 198 days.

(21) Appl. No.: 16/911,453

(22) Filed: Jun. 25, 2020

(65) Prior Publication Data

US 2020/0328454 A1    Oct. 15, 2020

Related U.S. Application Data

(63) Continuation of application No. PCT/JP2018/041892, filed on Nov. 13, 2018.

(30) Foreign Application Priority Data

Jan. 5, 2018  (JP) .............................. JP2018-000419

(51) Int. Cl.
*H01M 10/0562*    (2010.01)
*C01F 17/36*    (2020.01)
(Continued)

(52) U.S. Cl.
CPC ............. *C01F 17/36* (2020.01); *H01M 4/131* (2013.01); *H01M 4/525* (2013.01);
(Continued)

(58) Field of Classification Search
CPC .. C01F 17/36; C01P 2002/02; C01P 2002/72; C01P 2002/76; C01P 2004/51;
(Continued)

(56) References Cited

U.S. PATENT DOCUMENTS

| 4,352,869 A | 10/1982 | Mellors |
| 5,506,073 A | 4/1996 | Angell et al. |

(Continued)

FOREIGN PATENT DOCUMENTS

| CN | 105254184 A | 1/2016 |
| CN | 105680048 A | 6/2016 |

(Continued)

OTHER PUBLICATIONS

Extended European Search Report dated Jan. 29, 2021 for the related European Patent Application No. 18898666.5.
(Continued)

*Primary Examiner* — Victoria H Lynch
(74) *Attorney, Agent, or Firm* — McDermott Will & Emery LLP

(57) ABSTRACT

Provided is a solid electrolyte material comprising Li, Y, Br, and I, wherein in an X-ray diffraction pattern in which Cu-Kα is used as a radiation source, peaks are present within all ranges of diffraction angles 2θ of 12.5° to 14.0°, 25.0° to 27.8°, 29.2° to 32.3°, 41.9° to 46.2°, 49.5° to 54.7°, and 51.9° to 57.5°.

8 Claims, 10 Drawing Sheets

(51) Int. Cl.
  *H01M 4/131* (2010.01)
  *H01M 4/525* (2010.01)
  *H01M 10/0525* (2010.01)
  *H01M 4/02* (2006.01)

(52) U.S. Cl.
  CPC ... *H01M 10/0525* (2013.01); *H01M 10/0562* (2013.01); *H01M 2004/027* (2013.01); *H01M 2004/028* (2013.01); *H01M 2300/008* (2013.01)

(58) Field of Classification Search
  CPC .............. C01P 2004/61; C01P 2004/62; C01P 2006/40; H01B 1/06; H01M 10/0525; H01M 10/0562; H01M 2004/027; H01M 2004/028; H01M 2300/008; H01M 4/131; H01M 4/366; H01M 4/525; H01M 4/62; Y02E 60/10
  See application file for complete search history.

(56) References Cited

U.S. PATENT DOCUMENTS

| | | | |
|---|---|---|---|
| 5,714,279 | A | 2/1998 | Zajac, Jr. et al. |
| 9,160,034 | B2 | 10/2015 | Kato et al. |
| 10,008,735 | B2 | 6/2018 | Ohtomo et al. |
| 2004/0151986 | A1 | 8/2004 | Park et al. |
| 2011/0045355 | A1 | 2/2011 | Ichikawa |
| 2012/0301796 | A1 | 11/2012 | Ohtomo et al. |
| 2012/0308900 | A1 | 12/2012 | Ogasa |
| 2013/0295464 | A1 | 11/2013 | Yanagi et al. |
| 2015/0147659 | A1 | 5/2015 | Kato |
| 2016/0103232 | A1 | 4/2016 | Ouspenski et al. |
| 2016/0149259 | A1 | 5/2016 | Osada et al. |
| 2016/0156064 | A1 | 6/2016 | Miyashita et al. |
| 2016/0204467 | A1 | 7/2016 | Nogami et al. |
| 2016/0248119 | A1 | 8/2016 | Kato |
| 2016/0268630 | A1 | 9/2016 | Tsukada et al. |
| 2016/0285078 | A1 | 9/2016 | Deschamps et al. |
| 2016/0308210 | A1 | 10/2016 | Sakuda et al. |
| 2016/0359193 | A1 | 12/2016 | Yi et al. |
| 2017/0040637 | A1 | 2/2017 | Ceder et al. |
| 2017/0179481 | A1 | 6/2017 | Yamada et al. |
| 2017/0187066 | A1 | 6/2017 | Tsujimura et al. |
| 2017/0222257 | A1 | 8/2017 | Miyashita et al. |
| 2017/0229734 | A1 | 8/2017 | Furukawa et al. |
| 2017/0288281 | A1 | 10/2017 | Chiang et al. |
| 2018/0269521 | A1 | 9/2018 | Ohtomo et al. |
| 2019/0067736 | A1 | 2/2019 | Yoshioka et al. |
| 2019/0088995 | A1 | 3/2019 | Asano et al. |
| 2019/0097266 | A1 | 3/2019 | Yamamoto et al. |
| 2020/0212481 | A1 | 7/2020 | Nagamine et al. |
| 2020/0328455 | A1 | 10/2020 | Sakai et al. |
| 2020/0328457 | A1 | 10/2020 | Sakai et al. |
| 2020/0328460 | A1 | 10/2020 | Asano et al. |
| 2020/0328461 | A1 | 10/2020 | Asano et al. |
| 2020/0328462 | A1 | 10/2020 | Asano et al. |
| 2020/0328464 | A1 | 10/2020 | Asano et al. |
| 2020/0328465 | A1 | 10/2020 | Sakaida et al. |
| 2020/0328468 | A1 | 10/2020 | Sakaida et al. |
| 2020/0328469 | A1 | 10/2020 | Asano et al. |
| 2020/0335817 | A1 | 10/2020 | Asano et al. |
| 2020/0350615 | A1 | 11/2020 | Sakaida et al. |
| 2020/0350622 | A1 | 11/2020 | Sakaida et al. |

FOREIGN PATENT DOCUMENTS

| | | |
|---|---|---|
| CN | 108701860 A | 10/2018 |
| EP | 2916381 B1 | 6/2016 |
| EP | 3428929 A1 | 1/2019 |
| EP | 3496202 A1 | 6/2019 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| IN | 201847045950 A | 2/2019 |
| JP | S57-132677 A | 8/1982 |
| JP | 5-306117 | 11/1993 |
| JP | H08-171938 A | 7/1996 |
| JP | H09-293516 A | 11/1997 |
| JP | 11-238528 A | 8/1999 |
| JP | 2001-052733 A | 2/2001 |
| JP | 2004-235155 A | 8/2004 |
| JP | 2006-244734 | 9/2006 |
| JP | 2008-021556 A | 1/2008 |
| JP | 2011-129312 | 6/2011 |
| JP | 5076134 B | 11/2012 |
| JP | 2012-246196 | 12/2012 |
| JP | 2013-073791 A | 4/2013 |
| JP | 2015-011901 | 1/2015 |
| JP | 2015-032529 A | 2/2015 |
| JP | 2015-056349 A | 3/2015 |
| JP | 2016-024874 A | 2/2016 |
| JP | 2016-171067 A | 9/2016 |
| JP | 2017-059342 A | 3/2017 |
| JP | 2017-091953 A | 5/2017 |
| JP | 2017-091955 A | 5/2017 |
| JP | 2017-117753 A | 6/2017 |
| JP | 2017-518622 | 7/2017 |
| JP | 2017-152324 A | 8/2017 |
| JP | 6222134 B2 | 11/2017 |
| JP | 2017-224474 A | 12/2017 |
| WO | 2011/073798 A2 | 6/2011 |
| WO | 2015/011937 | 1/2015 |
| WO | 2015/030052 A1 | 3/2015 |
| WO | 2015/049986 A1 | 4/2015 |
| WO | 2017/108105 A1 | 6/2017 |
| WO | 2017/154766 | 9/2017 |
| WO | 2017/154922 A1 | 9/2017 |
| WO | 2018/025582 | 2/2018 |

OTHER PUBLICATIONS

Extended European Search Report dated Feb. 5, 2021 for the related European Patent Application No. 18898795.2.
Extended European Search Report dated Feb. 9, 2021 for the related European Patent Application No. 18898242.5.
Extended European Search Report dated Feb. 9, 2021 for the related European Patent Application No. 18898043.7.
Extended European Search Report dated Feb. 9, 2021 for the related European Patent Application No. 18898663.2.
Extended European Search Report dated Feb. 9, 2021 for the related European Patent Application No. 18898873.7.
Extended European Search Report dated Feb. 9, 2021 for the related European Patent Application No. 18898935.4.
Extended European Search Report dated Feb. 9, 2021 for the related European Patent Application No. 18902720.4.
Extended European Search Report dated Feb. 9, 2021 for the related European Patent Application No. 18898525.3.
Extended European Search Report dated Feb. 10, 2021 for the related European Patent Application No. 18898462.9.
Extended European Search Report dated Feb. 15, 2021 for the related European Patent Application No. 18898524.6.
Lutz, H.D. et al., "Ionic motion of tetrahedrally and octahedrally coordinated lithium ions in ternary and quaternary halides", Solid State Ionics, North Holland Pub. Company. Amsterdam; NL, vol. 28-30, Sep. 1, 1988, pp. 1282-1286, XP024682689.
Asano Tetsuya, et al., "Solid Halide Electrolytes with High Lithium-Ion Conductivity for Application in 4 V Class Bulk-Type All-Solid-State Batteries," Advanced Materials, vol. 30, No. 44, Sep. 14, 2018, p. 1803075, XP055721991.
International Search Report of PCT application No. PCT/JP2018/041892 dated Feb. 19, 2019.
Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.

(56) References Cited

OTHER PUBLICATIONS

Andreas Bohnsack et al., "Ternary Chlorides of the Rare-Earth Elements with Lithium, Li3MCl6 (M=Tb—Lu, Y, Sc) Synthesis, Crystal Structures, and Ionic Motion", Journal of Inorganic and General Chemistry, Jul. 1997, vol. 623/Issue 7, pp. 1067-1073.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/046262 dated Mar. 19, 2019.
International Search Report of International Application No. PCT/JP2018/041900 dated Feb. 19, 2019.
International Search Report of International Application No. PCT/JP2018/041897 dated Feb. 19, 2019.
International Search Report of International Application No. PCT/JP2018/046263 dated Mar. 19, 2019.
International Search Report of International Application No. PCT/JP2018/046264 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Lithium ion conductivity of Li3InBr6 doped with different element", Denka Chemical Society 70th Anniversary Conference Abstracts, Mar. 25, 2003, p. 384; with English translation.
Yasumasa Tomita et al., "Preparation of Substituted Compounds of Lithium Indium Bromide and Fabrication of All Solid-State battery", Recent Innovations in Chemical Engineering, 2017, 10, 12-17.
English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Mar. 28, 2022 for the related Indian Patent Application No. 202047027797.
Indian Examination Report dated Apr. 4, 2022 for the related Indian Patent Application No. 202047027476.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H-J., and H. D. Lutz, "Neue schnelle Ionenleiter vom Typ MI3 MIIICl6 (MI=Li, Na, Ag; MIII=In, Y)." Zeitschrift fur anorganische und allgemeine Chemie 613.7 (1992): 26-30 (Year: 1992).
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1-xMxBr6 (M=Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).
Indian Examination Report dated Jun. 21, 2022 for the related Indian Patent Application No. 202047027487.

SOLID ELECTROLYTE MATERIAL AND BATTERY

BACKGROUND

1. Technical Field

The present disclosure relates to a solid electrolyte material and a battery.

2. Description of the Related Art

Patent Literature 1 discloses an all-solid battery using a sulfide solid electrolyte.

Patent Literature 2 discloses an all-solid battery using, as a solid electrolyte, a halide including indium.

Non-Patent Literature 1 discloses $Li_3YBr_6$.

CITATION LIST

Patent Literature

Patent Literature 1: Japanese Patent Application Publication No. 2011-129312
Patent Literature 2: Japanese Patent Application Publication No. 2006-244734

Non-Patent Literature

Non-patent Literature 1: Z. anorg. allg. Chem. 623 (1997), 1352.

SUMMARY

In the prior art, realization of a solid electrolyte material having high lithium ion conductivity is desired.

The solid electrolyte material in one aspect of the present disclosure comprises Li, Y, Br, and I, wherein in an X-ray diffraction pattern in which Cu-Kα is used as a radiation source, peaks are present within all ranges of diffraction angles 2θ of 12.5° to 14.0°, 25.0° to 27.8°, 29.2° to 32.3°, 41.9° to 46.2°, 49.5° to 54.7°, and 51.9° to 57.5°.

According to the present disclosure, a solid electrolyte material having high lithium ion conductivity can be realized.

DETAILED DESCRIPTION OF THE EMBODIMENTS

Hereinafter, embodiments of the present disclosure will be described with reference to the drawings.

First Embodiment

The solid electrolyte material in the first embodiment is a solid electrolyte material comprising Li, Y, Br, and I, wherein in an X-ray diffraction pattern in which Cu-Kα is used as a radiation source, peaks are present within all ranges of diffraction angles 2θ of 12.5° to 14.0°, 25.0° to 27.8°, 29.2° to 32.3°, 41.9° to 46.2°, 49.5° to 54.7°, and 51.9° to 57.5°.

According to the above configuration, a halide solid electrolyte material having high lithium ion conductivity can be realized. In addition, a solid electrolyte material having a stable structure can be realized in the presumed operation temperature range of a battery (for example, within the range of −30° C. to 80° C.). In other words, the solid electrolyte material of the first embodiment does not have a configuration (for example, the configuration of Patent Literature 2) in which a phase transition temperature is present in the operation temperature range of the battery. Thereby, even in an environment where there is a temperature change, high ion conductivity can be stably maintained without causing a phase transition within the operation temperature range of the battery, and a more practical battery can be realized.

In addition, according to the above configuration, since a solid electrolyte material having a conductivity of not less than $1 \times 10^{-4}$ S/cm can be realized, an all-solid secondary battery excellent in a charge/discharge characteristic can be realized. In addition, a solid electrolyte material having an ion conductivity of not less than $7 \times 10^{-4}$ S/cm can be realized depending on a diffraction angle of a provided peak pattern. In this case, an all-solid secondary battery capable of being charged and discharged more rapidly can be realized.

In addition, according to the above configuration, an all-solid secondary battery excellent in the charge/discharge characteristic can be realized by using the solid electrolyte material of the first embodiment. In addition, by using the solid electrolyte material of the first embodiment, an all-solid secondary battery which does not include sulfur can be realized. In other words, the solid electrolyte material of the first embodiment does not have a configuration (for example, the configuration of Patent Literature 1) in which hydrogen sulfide is generated when exposed to the atmosphere. As a result, an all-solid secondary battery which does not generate hydrogen sulfide, is excellent in safety, and has high performance can be realized.

Figure 1:
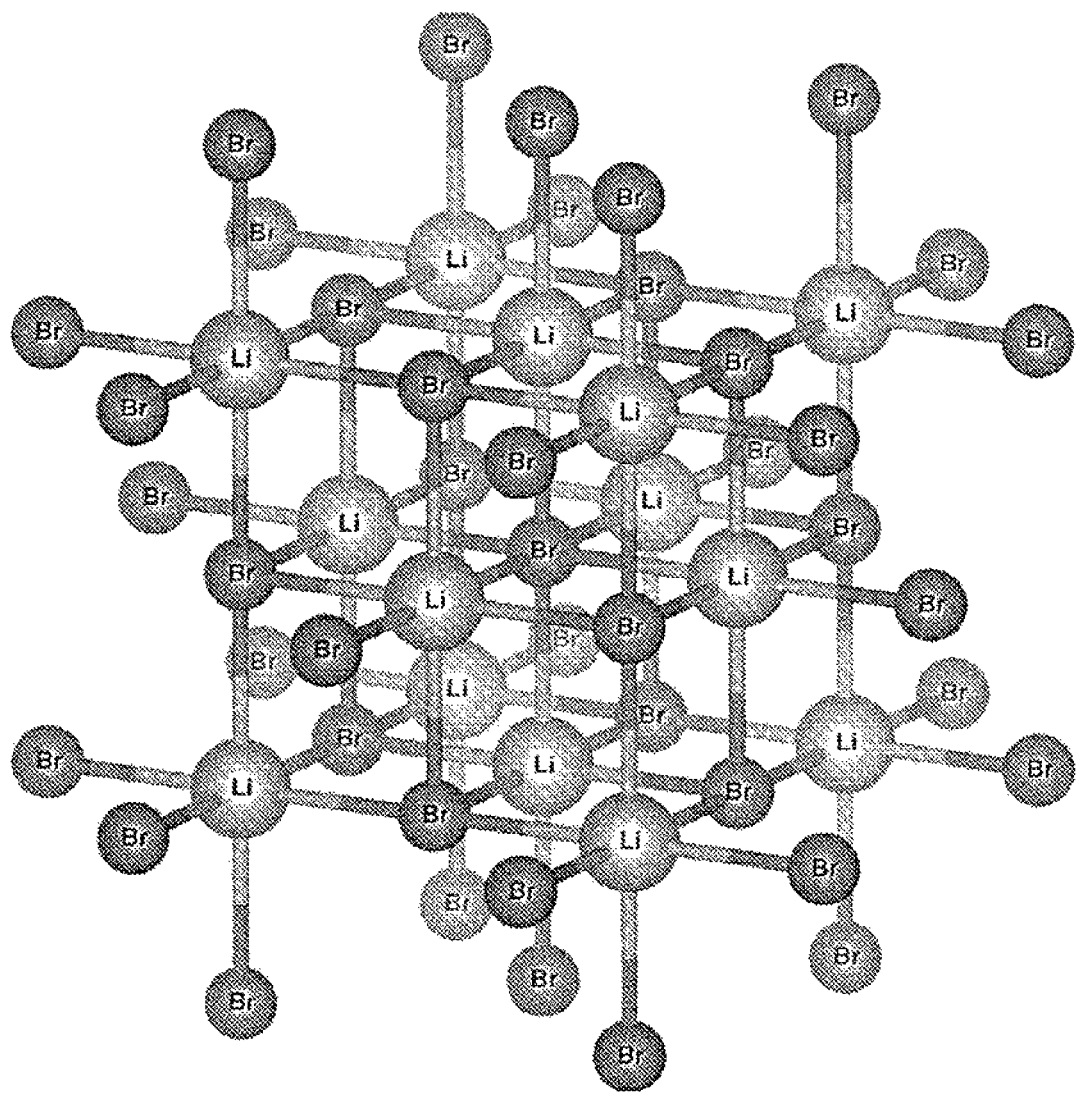
FIG. 1 is a schematic diagram showing a crystal structure of LiBr.

The solid electrolyte material in the first embodiment has, as a fundamental structure, LiBr, which has a rock salt structure. FIG. 1 shows a crystal structure of LiBr. Non-Patent Literature 1 reports a crystal structure and a lattice constant of a material formed by doping LiBr with a rare earth element having an ion valence of +3. As a representative example thereof, $Li_3ErBr_6$ (hereinafter, which may be referred to as LEB) has been reported, and its detailed atomic arrangement is published in the Inorganic Crystal Structure Database (ICSD).

Figure 2:
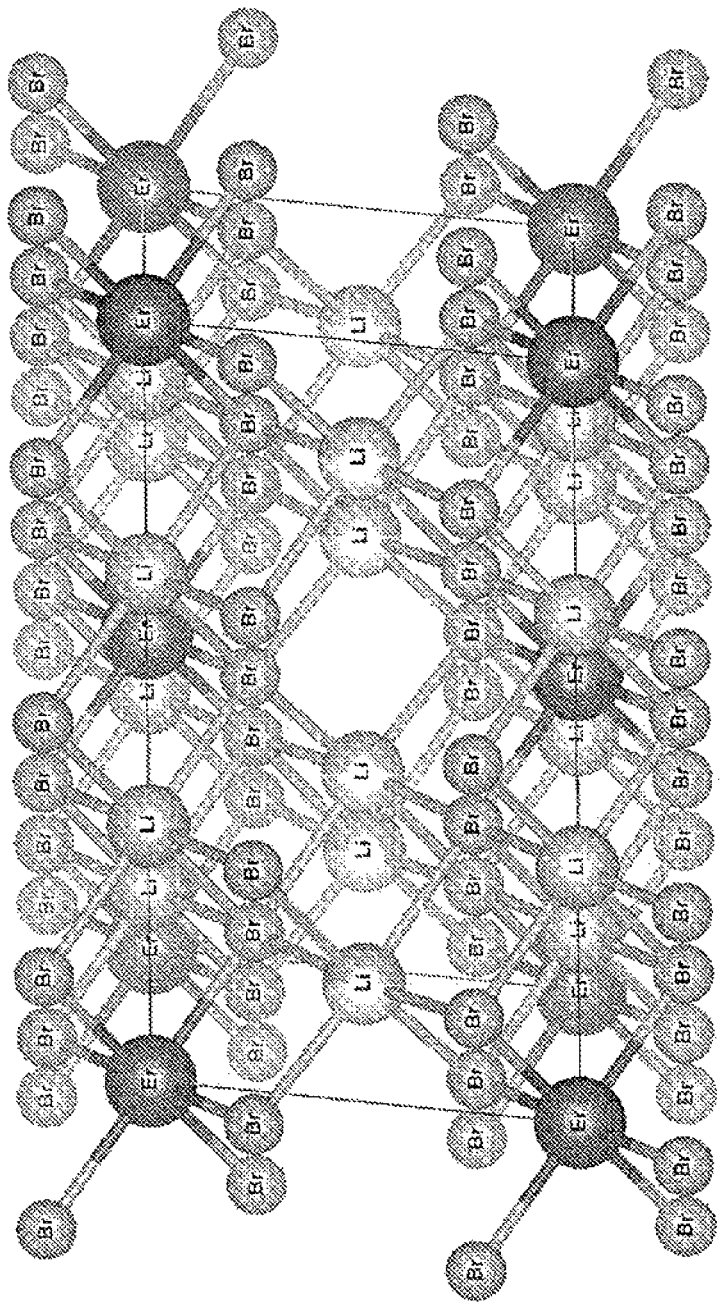
FIG. 2 is a schematic diagram showing a crystal structure of $Li_3ErBr_6$.

FIG. 2 is a schematic diagram showing the crystal structure of the LEB structure. It is presumed that anion arrangement in the crystal structure is the same as that of LiBr. In addition, Non-Patent Literature 1 discloses a crystal structure of $Li_3YBr_6$. The space group in $Li_3YBr_6$ is C2/m, and the details of the lattice constant thereof is a=6.926 Å (namely, 0.6926 nm), b=11.959 Å (namely, 1.1959 nm), c=6.843 Å (0.6843 nm), and β=109.54°. The solid electrolyte material in the first embodiment is a material having a form in which some of Br sites are further substituted with iodine (I). A solid electrolyte that exhibits higher Li ion conduction and a high-performance battery having the same can be realized by substituting the Br sites with I.

In addition, cation arrangement of the solid electrolyte material in the first embodiment does not have to be the same as cation arrangement of the LEB structure. In other words, at least a part of Y and at least a part of Li may be irregularly arranged. In addition, if a vacancy of a cation site is present in the crystal, a part of at least one kind of cation selected from the group consisting of a Li cation and a Y cation and the vacancy may be exchanged with each other. According to this configuration, a solid electrolyte material having higher lithium ion conductivity can be realized. Specifically, since the arrangement of Y can be made irregular, conduction paths of lithium ions are connected three-dimensionally with each other to further improve the lithium ion conductivity.

The solid electrolyte material in the first embodiment may include a first crystal phase and a different crystal phase having a crystal structure different from that of the first crystal phase.

In this case, the different crystal phase may be interposed between portions of the first crystal phase, and the solid electrolyte material in the first embodiment may include an amorphous phase. In this case, the amorphous phase may be interposed between particles of the solid electrolyte described in the present embodiment. According to the above configuration, a solid electrolyte material having higher lithium ion conductivity can be realized. Specifically, the conduction of lithium ions is promoted by the amorphous phase. As a result, the lithium ion conductivity is further improved.

In the solid electrolyte material in the first embodiment, in the X-ray diffraction pattern using Cu-Kα as a radiation source, peaks may be present within all the ranges of the diffraction angles 2θ of 12.5° to 14.0°, 25.0° to 27.4°, 29.2° to 31.6°, 41.9° to 45.1°, 49.5° to 53.4°, and 51.9° to 56.1°.

According to the above configuration, a solid electrolyte material having higher lithium ion conductivity can be realized.

In the solid electrolyte material in the first embodiment, in the X-ray diffraction pattern using the Cu-Kα as a radiation source, peaks may be present within all the ranges of the diffraction angles 2θ of 12.9° to 13.5°, 26.1° to 27.1°, 30.2° to 31.3°, 43.4° to 44.9°, 51.4° to 53.2°, and 53.8° to 55.8°.

According to the above configuration, a solid electrolyte material having higher lithium ion conductivity can be realized.

The solid electrolyte material in the first embodiment may include Li, Y, Br, I, and Cl. In this case, in the X-ray diffraction pattern using the Cu-Kα as a radiation source, peaks may be present within all the ranges of the diffraction angles 2θ of 12.6° to 14.0°, 25.4° to 27.8°, 29.7° to 32.3°, 42.6° to 46.2°, 50.4° to 54.7°, and 53.0° to 57.5°.

According to the above configuration, a solid electrolyte material having higher lithium ion conductivity can be realized.

A shape of the solid electrolyte material in the first embodiment is not particularly limited, and may be, for example, an acicular shape, a spherical shape, or an elliptical shape. For example, the solid electrolyte material in the first embodiment may be particles. In addition, the solid electrolyte material in the first embodiment may be formed into a pellet shape or a plate shape by pressurized particles. In addition, the solid electrolyte material in the first embodiment may include a crystal phase or may include an amorphous phase.

For example, if the shape of the solid electrolyte material in the first embodiment is particulate (for example, spherical), the median diameter thereof may be not less than 0.1 μm and not more than 100 μm. In addition, in the first embodiment, the median diameter may be not less than 0.5 μm and not more than 10 μm.

According to the above configuration, the ion conductivity can be further improved. In addition, a better dispersion state of the solid electrolyte material in the first embodiment and an active material can be formed. In addition, in the first embodiment, the solid electrolyte material may have a smaller median diameter than the active material.

According to the above configuration, a better dispersed state of the solid electrolyte material in the first embodiment and the active material can be formed.

In the present disclosure, the recitation "a range in which a predetermined value A is a value B to a value C" means "a range in which B A C".

<Manufacturing Method of Solid Electrolyte Material>

The solid electrolyte material in the first embodiment may be manufactured by the following method, for example.

Binary halide raw material powders are prepared so as to provide a blending ratio of a target composition. For example, if $Li_3YBr_3I_3$ is produced, LiBr and $YI_3$ are prepared in a molar ratio of 3:1. The raw materials are not particularly limited. For example, LiI, $YBr_3$, LiCl, and $YCl_3$ may be used in addition to the above-described raw materials. The composition of anions can be determined by selecting the kinds of the raw material powders. After mixing the raw material powders well, the raw material powders are mixed and ground using a method such as mechanochemical milling to react. Alternatively, the raw material powders may be mixed well and then sintered in a vacuum or in an inert atmosphere such as an argon or nitrogen atmosphere.

Thereby, the solid electrolyte material including the crystal phase as described above is provided.

The structure of the crystal phase in the solid electrolyte material (namely, the crystal structure) and the position of each peak in the X-ray diffraction pattern using the Cu-Kα as a radiation source can be determined by adjusting a raw material ratio and by adjusting a reaction method and a reaction condition of the raw material powders.

Second Embodiment

Hereinafter, the second embodiment will be described. The description which has been set forth in the above-described first embodiment is omitted as appropriate.

The battery in the second embodiment is configured using the solid electrolyte material described in the first embodiment.

The battery in the second embodiment comprises a positive electrode, a negative electrode, and an electrolyte layer.

The electrolyte layer is a layer provided between the positive electrode and the negative electrode.

At least one of the positive electrode, the electrolyte layer, and the negative electrode includes the solid electrolyte material in the first embodiment.

According to the above configuration, the charge/discharge characteristic of the battery can be improved.

A specific example of the battery in the second embodiment will be described below.

Figure 3:
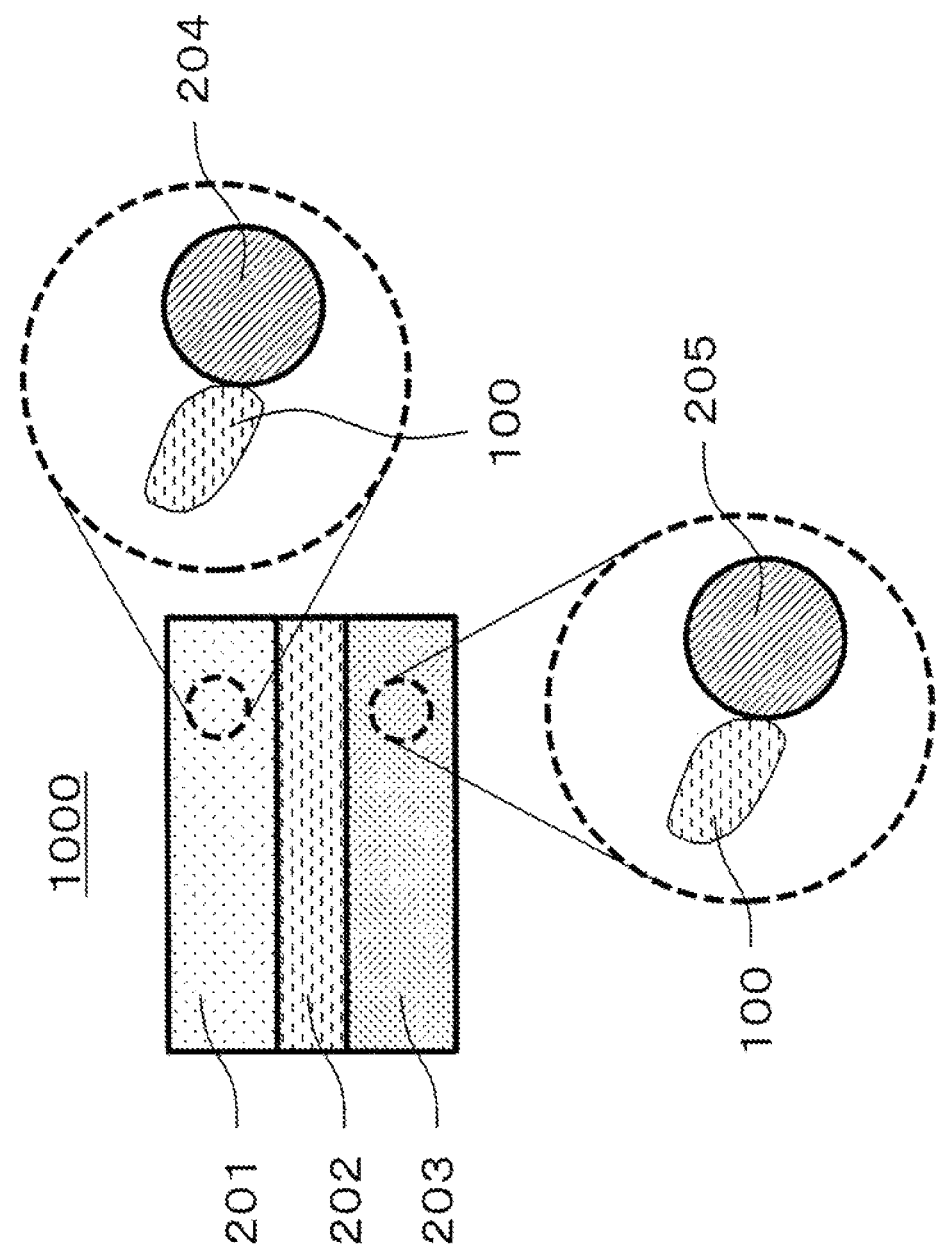
FIG. 3 is a cross-sectional view showing a schematic configuration of a battery in a second embodiment.

FIG. 3 is a cross-sectional view showing a schematic configuration of a battery 1000 in the second embodiment.

The battery 1000 in the second embodiment comprises a positive electrode 201, a negative electrode 203, and an electrolyte layer 202.

The positive electrode 201 includes positive electrode active material particles 204 and solid electrolyte particles 100.

The electrolyte layer 202 is disposed between the positive electrode 201 and the negative electrode 203.

The electrolyte layer 202 includes an electrolyte material (for example, a solid electrolyte material).

The negative electrode 203 includes negative electrode active material particles 205 and the solid electrolyte particles 100.

The solid electrolyte particles 100 are particles each formed of the solid electrolyte material in the first embodiment or particles each including the solid electrolyte material in the first embodiment as a main component.

The positive electrode 201 includes a material having a characteristic of storing and releasing metal ions (for example, lithium ions). The positive electrode 201 includes, for example, a positive electrode active material (for example, the positive electrode active material particles 204).

Examples of the positive electrode active material include Li-containing transition metal oxides (e.g., Li(NiCoAl)O$_2$ or LiCoO$_2$), transition metal fluorides, polyanion materials, fluorinated polyanion materials, transition metal sulfides, transition metal oxyfluorides, transition metal oxysulfides, and transition metal oxynitrides.

The median diameter of the positive electrode active material particles 204 may be not less than 0.1 µm and not more than 100 µm. If the median diameter of the positive electrode active material particles 204 is not less than 0.1 µm, the positive electrode active material particles 204 and the halide solid electrolyte material can form a good dispersion state in the positive electrode. As a result, the charge/discharge characteristic of the battery is improved. In addition, if the median diameter of the positive electrode active material particles 204 is not more than 100 µm, Li diffusion in the positive electrode active material particles 204 is accelerated. As a result, the battery can operate at a high output.

The positive electrode active material may be coated on a part or the entirety of its surface with an oxide different from the positive electrode active material in order to perform a higher performance battery operation. As a typical coating material, LiNbO$_3$ can be used. As long as the battery operation can be performed, the surface coating material is not limited to LiNbO$_3$, and the coating method is not limited, either. Typically, the thickness of the coating material is desirably approximately 1 to 100 nm to realize a high-performance battery. Examples of the coating material include a Li—Nb—O compound such as LiNbO$_3$, a Li—B—O compound such as LiBO$_2$ or Li$_3$BO$_3$, a Li—Al—O compound such as LiAlO$_2$, a Li—Si—O compound such as Li$_4$SiO$_4$, Li$_2$SO$_4$, a Li—Ti—O compound such as Li$_4$Ti$_5$O$_{12}$, a Li—Zr—O compound such as Li$_2$ZrO$_3$, a Li—Mo—O compound such as Li$_2$MoO$_3$, a Li-V-O compound such as LiV$_2$O$_5$, and a Li—W—O compound such as Li$_2$WO$_4$.

The median diameter of the positive electrode active material particles 204 may be larger than the median diameter of the halide solid electrolyte material. Thereby, the good dispersion state of the positive electrode active material particles 204 and the halide solid electrolyte material can be formed.

With regard to a volume ratio "v:100−v" between the positive electrode active material particles 204 and the halide solid electrolyte material included in the positive electrode 201, 30≤v≤95 may be satisfied. In the case of 30≤v, a sufficient battery energy density can be secured. In addition, if v≤95, an operation at a high output can be realized.

The thickness of the positive electrode 201 may be not less than 10 µm and not more than 500 µm. If the thickness of the positive electrode is not less than 10 µm, a sufficient battery energy density can be ensured. If the thickness of the positive electrode is not more than 500 µm, an operation at a high output can be realized.

The electrolyte layer 202 is a layer including an electrolyte material. The electrolyte material is, for example, a solid electrolyte material. In other words, the electrolyte layer 202 may be a solid electrolyte layer.

The solid electrolyte layer may include the solid electrolyte material in the first embodiment as a main component. In other words, the solid electrolyte layer may include the solid electrolyte material in the above-described first embodiment, for example, in a weight ratio of not less than 50% with respect to the whole of the solid electrolyte layer (namely, not less than 50% by weight).

According to the above configuration, the charge/discharge characteristic of the battery can be further improved.

In addition, the solid electrolyte layer may include the solid electrolyte material in the first embodiment described above, for example, in a weight ratio of not less than 70% with respect to the whole of the solid electrolyte layer (namely, not less than 70% by weight).

According to the above configuration, the charge/discharge characteristic of the battery can be further improved.

The solid electrolyte layer may include the solid electrolyte material in the above-described first embodiment as a main component, and may further include inevitable impurities, starting materials used when the solid electrolyte material is synthesized, by-products, or decomposition products.

In addition, the solid electrolyte layer may include the solid electrolyte material in the first embodiment, for example, at a weight ratio of 100% (namely, 100% by weight) with respect to the whole of the solid electrolyte layer, excluding impurities mixed inevitably.

According to the above configuration, the charge/discharge characteristic of the battery can be further improved.

As described above, the solid electrolyte layer may be composed only of the solid electrolyte material in the first embodiment.

Alternatively, the solid electrolyte layer may be composed of only a solid electrolyte material different from the solid electrolyte material in the first embodiment. As the solid electrolyte material different from the solid electrolyte material in the first embodiment, for example, Li$_2$MgX$_4$, Li$_2$FeX$_4$, Li(Al,Ga,In)X$_4$, Li$_3$(Al,Ga,In)X$_6$, or LiI (X:Cl, Br, I) may be used.

The solid electrolyte layer may include simultaneously the solid electrolyte material in the first embodiment and the solid electrolyte material different from the solid electrolyte material in the first embodiment. At this time, both may be dispersed uniformly. Alternatively, a layer formed of the solid electrolyte material in the first embodiment and a layer formed of the solid electrolyte material different from the solid electrolyte material in the first embodiment may be sequentially arranged in the stacking direction of the battery.

The thickness of the solid electrolyte layer may be not less than 1 μm and not more than 100 μm. If the thickness of the solid electrolyte layer is not less than 1 μm, the positive electrode 201 and the negative electrode 203 are easily separated. In addition, if the thickness of the solid electrolyte layer is not more than 100 μm, an operation with high output can be realized.

The negative electrode 203 includes a material having a characteristic of storing and releasing metal ions (for example, Li ions). The negative electrode 203 includes, for example, a negative electrode active material (for example, the negative electrode active material particles 205).

As the negative electrode active material, a metal material, a carbon material, an oxide, a nitride, a tin compound, or a silicon compound can be used. The metal material may be a single metal. Alternatively, the metal material may be an alloy. Examples of the metal material include lithium metal and a lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound can be used. If a negative electrode active material having a low average reaction voltage is used, the effect of suppressing electrolysis by the solid electrolyte material in the first embodiment is better exhibited.

The median diameter of the negative electrode active material particles 205 may be not less than 0.1 μm and not more than 100 μm. If the median diameter of the negative electrode active material particles 205 is not less than 0.1 μm, the negative electrode active material particles 205 and the solid electrolyte particles 100 can form a good dispersion state in the negative electrode. As a result, the charge/discharge characteristic of the battery is improved. In addition, if the median diameter of the negative electrode active material particles 205 is not more than 100 μm, the lithium diffusion in the negative electrode active material particles 205 is accelerated. As a result, the battery can operate at a high output.

The median diameter of the negative electrode active material particles 205 may be larger than the median diameter of the solid electrolyte particles 100. As a result, the good dispersion state of the negative electrode active material particles 205 and the halide solid electrolyte material can be formed.

With regard to the volume ratio "v:100−v" of the negative electrode active material particles 205 and the solid electrolyte particles 100 included in the negative electrode 203, $30 \leq v \leq 95$ may be satisfied. In a case of $30 \leq v$, a sufficient battery energy density can be secured. In addition, if $v \leq 95$, an operation at a high output can be realized.

The thickness of the negative electrode 203 may be not less than 10 μm and not more than 500 μm. If the thickness of the negative electrode is not less than 10 μm, a sufficient battery energy density can be secured. In addition, if the thickness of the negative electrode is not more than 500 μm, an operation with high output can be realized.

At least one of the positive electrode 201, the electrolyte layer 202, and the negative electrode 203 may include a sulfide solid electrolyte or an oxide solid electrolyte for the purpose of improving ion conductivity. As the sulfide solid electrolyte, $Li_2S-P_2S_5$, $Li_2S-SiS_2$, $Li_2S-B_2S_3$, $Li_2S-GeS_2$, $Li_{3.25}Ge_{0.25}P_{0.75}S_4$, or $Li_{10}GeP_2S_{12}$ can be used. As the oxide solid electrolyte, a NASICON solid electrolyte such as $LiTi_2(PO_4)_3$ and its element substitution products, a $(LaLi)TiO_3$ perovskite solid electrolyte, a LISICON solid electrolyte such as $Li_{14}ZnGe_4O_{16}$, $Li_4SiO_4$, or $LiGeO_4$ and its element substitution products, a garnet solid electrolyte such as $Li_7La_3Zr_2O_{12}$ and its element substitution products, $Li_3N$ and its H substitution products, or $Li_3PO_4$ and its N substitution products can be used.

At least one of the positive electrode 201, the electrolyte layer 202, and the negative electrode 203 may include an organic polymer solid electrolyte for the purpose of increasing ion conductivity. As the organic polymer solid electrolyte, for example, a compound of a polymer compound and a lithium salt can be used. The polymer compound may have an ethylene oxide structure. Since the polymer compound has the ethylene oxide structure, a large amount of lithium salt can be included, and the ion conductivity can be further increased. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt.

At least one of the positive electrode 201, the electrolyte layer 202, and the negative electrode 203 may include a non-aqueous electrolyte solution, a gel electrolyte, and an ionic liquid for the purpose of facilitating exchange of lithium ions and improving the output characteristic of the battery.

The non-aqueous electrolyte solution includes a non-aqueous solvent and a lithium salt dissolved in the non-aqueous solvent. As the non-aqueous solvent, a cyclic carbonate solvent, a chain carbonate solvent, a cyclic ether solvent, a chain ether solvent, a cyclic ester solvent, a chain ester solvent, or a fluorine solvent can be used. Examples of the cyclic carbonate solvent include ethylene carbonate, propylene carbonate, and butylene carbonate. Examples of the chain carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the chain ether solvent include 1,2-dimethoxyethane and 1,2-diethoxyethane. Examples of the cyclic ester solvent include γ-butyrolactone. Examples of the chain ester solvent include methyl acetate. Examples of the fluorine solvent include fluoroethylene carbonate, methyl fluoropropionate, fluorobenzene, fluoroethyl methyl carbonate, and fluorodimethylene carbonate. As the non-aqueous solvent, one non-aqueous solvent selected from these can be used alone. Alternatively, a combination of two or more non-aqueous solvents selected from these can be used as the non-aqueous solvent. The non-aqueous electrolyte solution may include at least one fluorine solvent selected from the group consisting of fluoroethylene carbonate, methyl fluoropropionate, fluorobenzene, fluoroethyl methyl carbonate, and fluorodimethylene carbonate. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, or $LiC(SO_2CF_3)_3$ can be used. As the lithium salt, one lithium salt selected from these may be used alone. Alternatively, a mixture of two or more lithium salts selected from these may be used as the lithium salt. The concentration of the lithium salt is, for example, in the range of 0.5 to 2 mol/liter.

As the gel electrolyte, a polymer material including a non-aqueous electrolyte solution can be used. As the polymer material, polyethylene oxide, polyacrylonitrile, polyvinylidene fluoride, polymethyl methacrylate, or a polymer having an ethylene oxide bond may be used.

The cation which forms the ionic liquid may be an aliphatic chain quaternary salt such as tetraalkylammonium or tetraalkylphosphonium, an aliphatic cyclic ammonium such as pyrrolidinium, morpholinium, imidazolinium, tetrahydropyrimidinium, piperazinium, or piperidinium, or a nitrogen-including heterocyclic aromatic cation such as pyridinium or imidazolium. The anion which forms the ionic liquid may be $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may include a lithium salt.

At least one of the positive electrode 201, the electrolyte layer 202, and the negative electrode 203 may include a binder for the purpose of improving adhesion between the particles. The binder is used to improve the binding property of the material which forms the electrode. The binders include polyvinylidene fluoride, polytetrafluoroethylene, polyethylene, polypropylene, aramid resin, polyamide, polyimide, polyamideimide, polyacrylonitrile, polyacrylic acid, methyl polyacrylate ester, ethyl polyacrylate eter, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, or carboxymethylcellulose. The binder may be a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. In addition, two or more kinds selected from these may be mixed and used as the binder.

In addition, at least one of the positive electrode 201 and the negative electrode 203 may include a conductive agent as necessary.

The conductive agent is used to lower electrode resistance. Examples of the conductive agent include graphite such as natural graphite or artificial graphite, carbon black such as acetylene black or ketjen black, a conductive fiber such as a carbon fiber or a metal fiber, carbon fluoride, a metal powder such as aluminum, a conductive whisker such as zinc oxide or potassium titanate, a conductive metal oxide such as titanium oxide, or a conductive polymer compound such as polyaniline, polypyrrole, or polythiophene. In addition, cost reduction can be achieved by using a carbon conductive agent as the conductive agent.

Note that the battery in the second embodiment can be configured as a battery having various shapes such as a coin shape, a cylindrical shape, a prism shape, a sheet shape, a button shape, a flat shape, or a laminated shape.

EXAMPLES

Hereinafter, details of the present disclosure will be described with reference to the inventive examples and comparative examples.

Inventive Example 1

Hereinafter, a method for synthesizing and evaluating the solid electrolyte in the present example will be described.

[Production of Solid Electrolyte Material]

In a glove box maintained in a dry and low-oxygen atmosphere with a dew point of −90° C. or less and an oxygen value of 5 ppm or less, raw material powders LiBr, $YBr_3$, LiI, and $YI_3$ were prepared so as to have a molar ratio of Li:Y:Br:I=3:1:6−x:x. These were ground and mixed in a mortar. Subsequently, milling processing was performed at 600 rpm for 25 hours using a planetary ball mill.

In the inventive examples 1-1 to 1-7, the values of x were 0.5, 1, 2, 3, 4, 5, and 5.5, respectively.

As a result, $Li_3YBr_{6-x}I_x$ powders, which were the solid electrolyte materials of the inventive example 1, were provided.

[Structural Evaluation of Solid Electrolyte Material]

Figure 5:
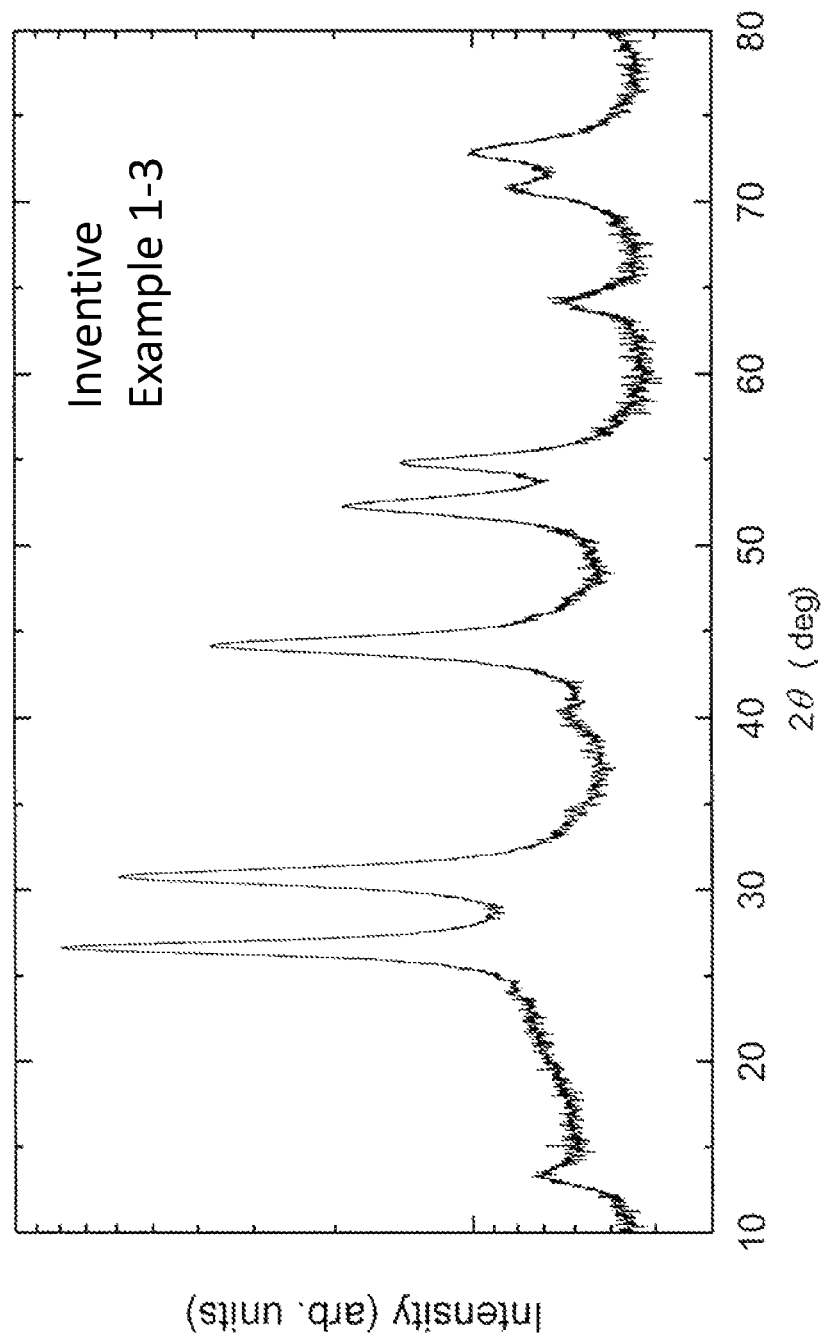
FIG. 5 is a diagram showing a peak pattern in an XRD of $Li_3YBr_4I_2$.

The synthesized solid electrolyte materials were evaluated using an X-ray diffraction (XRD) method in an environment where the synthesized solid electrolyte materials were maintained in a dry atmosphere with a dew point value of −40° C. or lower. For the X-ray source, Cu-Kα rays were used. In other words, the X-ray diffraction was measured by a θ-2θ method using Cu-Kα rays (wavelengths 1.5405 Å (i.e., 0.15405 nm) and 1.5444 Å (i.e., 0.15444 nm)) as X-rays. As a result, similar peak patterns were provided for all the materials synthesized as the inventive examples 1-1 to 1-7. FIG. 5 shows the XRD peak pattern of the inventive example 1-3, namely, $Li_3YBr_4I_2$ (x=2), as a typical XRD peak pattern of the inventive example 1.

[Evaluation of Lithium Ion Conductivity]

Figure 4:
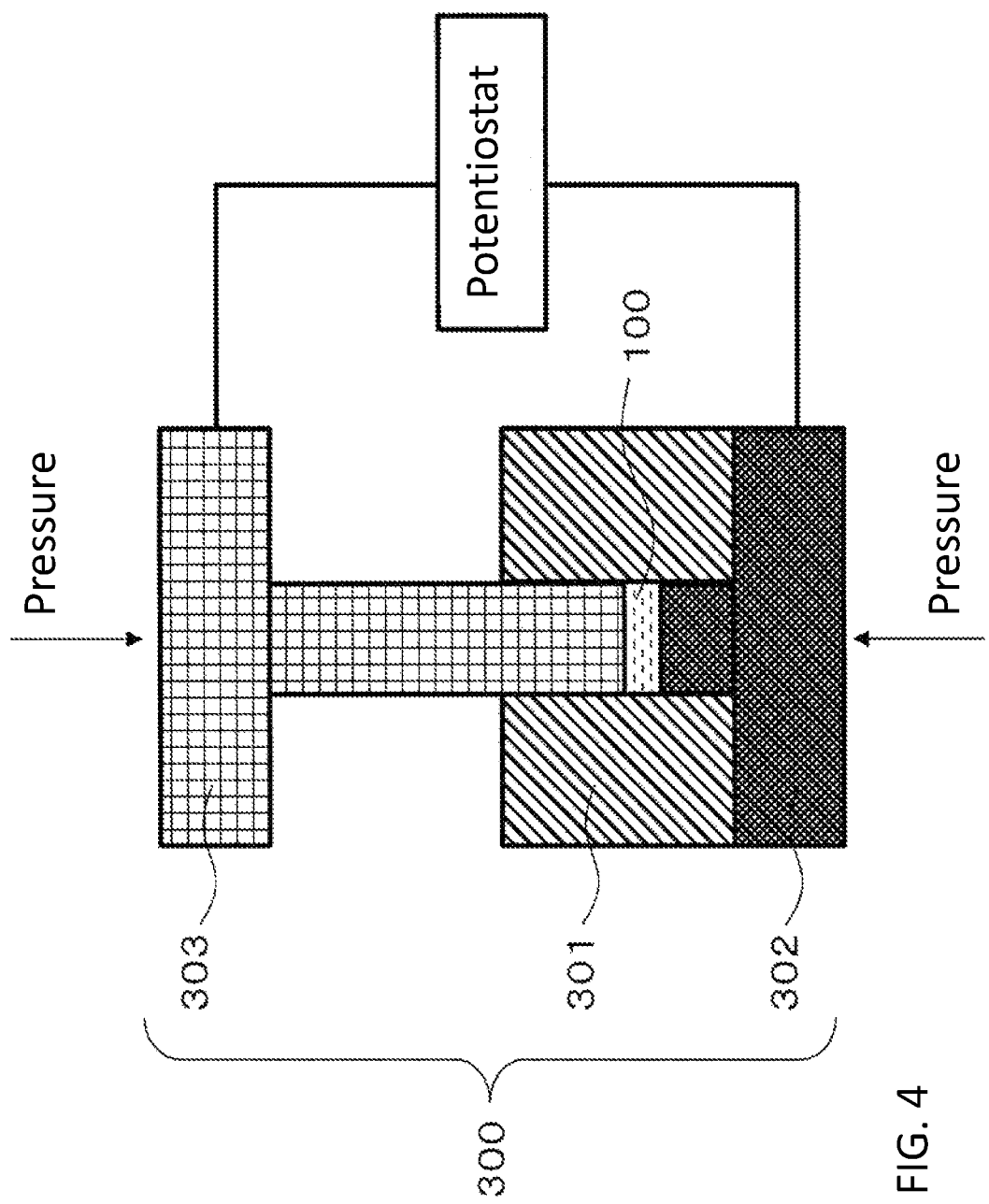
FIG. 4 is a schematic view showing an evaluation method of ion conductivity.

FIG. 4 is a schematic diagram showing an evaluation method of ion conductivity. A pressure-molding die 300 includes a frame 301 formed of an electronically insulating polycarbonate, and an upper punch part 303 and a lower punch part 302, both of which are formed of electron conductive stainless steel.

Using the configuration shown in FIG. 4, the ion conductivity was evaluated by the following method. In a glove box maintained in a dry and low-oxygen atmosphere with a dew point of −90° C. or less and an oxygen value of 5 ppm or less, the inside of the pressure-molding die 300 was filled with the powder of the solid electrolyte material of the inventive example 1 (example of the solid electrolyte particles 100). The powder was pressurized uniaxially at 400 MPa to produce a conductivity measurement cell of the inventive example 1. In a pressurized state, lead wires were routed from the upper punch part 303 and the lower punch part 302 and were connected to a potentiostat (Princeton Applied Research, VersaSTAT4) equipped with a frequency response analyzer. The ion conductivity at room temperature was measured by an electrochemical impedance measurement method.

The ion conductivity of the solid electrolyte materials of the inventive example 1 measured at 22° C. is shown in Table 1, which is shown below.

TABLE 1

| | Constituent elements | XRD peak angles | Conductivity ($10^{-4}$ S/cm) | Presence or Absence of Phase Transition | Initial Discharge Capacity (µAh) |
|---|---|---|---|---|---|
| Inventive Example 1-1 | Li, Y, Br, I | 13.75°, 27.30°, 31.47°, 45.08°, 53.31°, 55.91° | 5.2 | None | 800 |
| Inventive Example 1-2 | Li, Y, Br, I | 13.5°, 27.04°, 31.28, 44.84°, 53.14°, 55.74° | 7.1 | None | 810 |
| Inventive Example 1-3 | Li, Y, Br, I | 13.27°, 26.61°, 30.79°, 44.16°, 52.28°, 54.78° | 10.0 | None | 700 |
| Inventive Example 1-4 | Li, Y, Br, I | 12.93°, 26.15°, 30.28°, 43.41°, 51.41°, 53.87° | 8.2 | None | 680 |
| Inventive Example 1-5 | Li, Y, Br, I | 12.78°, 25.79°, 29.86°, 42.85°, 50.74°, 53.19° | 4.5 | None | 400 |
| Inventive Example 1-6 | Li, Y, Br, I | 12.69°, 25.54°, 29.56°, 42.40°, 50.18°, 52.63° | 3.6 | None | 200 |
| Inventive Example 1-7 | Li, Y, Br, I | 12.59°, 25.20°, 29.35°, 42.15°, 49.74°, 52.28° | 2.0 | None | 100 |
| Comparative Example 1-1 | Li, Y, I | 12.40°, 24.90°, 29.16°, 41.86°, 49.45°, 51.88° | 0.5 | None | 5 |
| Comparative Example 1-2 | Li, In, Br | — | <1E−3 | Present | — |
| Comparative Example 1-3 | Li, Fe, Cl | — | 8.7E−2 | — | 1 |

[Evaluation of Phase Transition]

Figure 7:
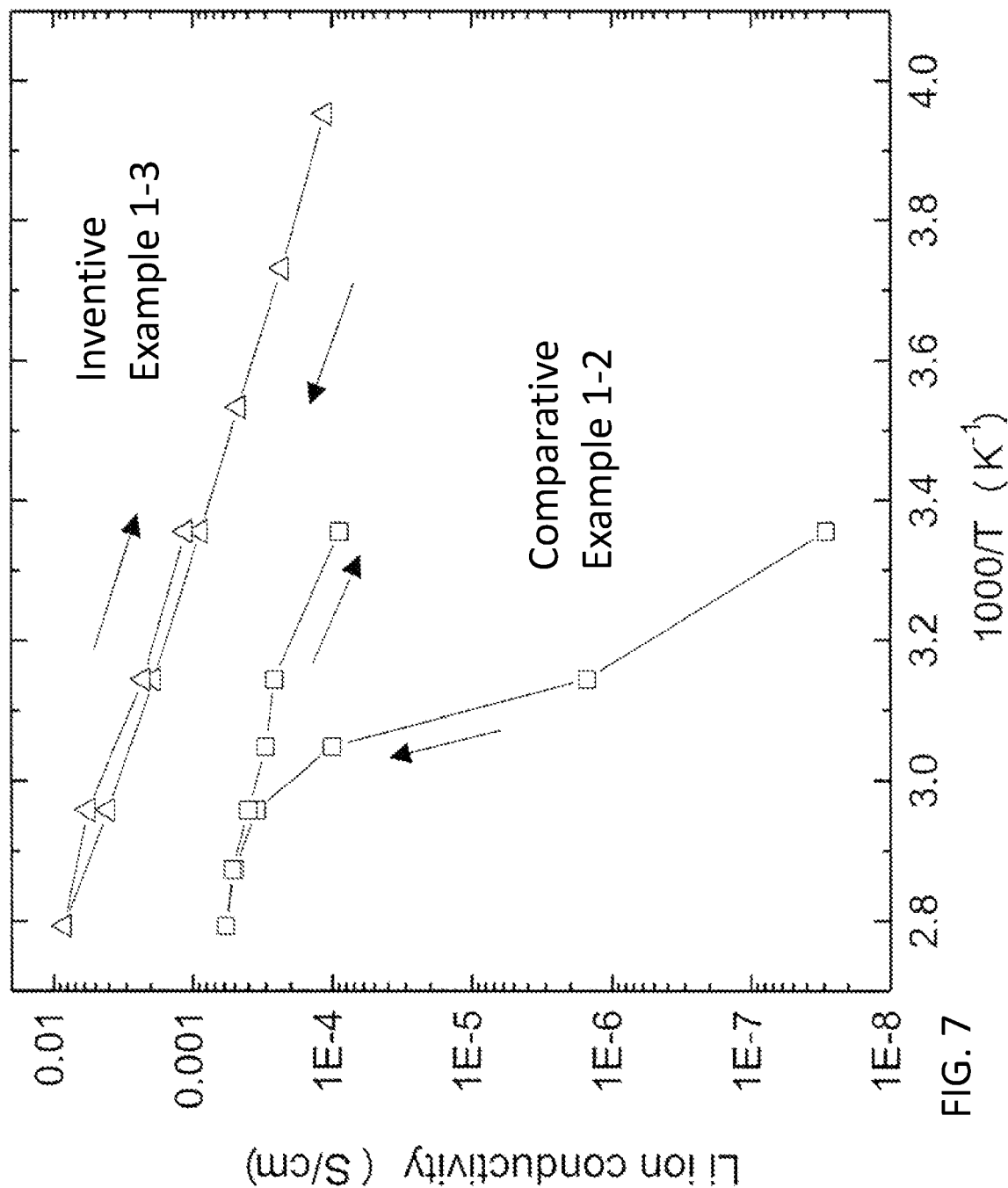
FIG. 7 is a graph showing temperature dependence of the ion conductivity of solid electrolytes.

FIG. 7 is a graph showing temperature dependence of the ion conductivity of the solid electrolytes. FIG. 7 shows the measurement results of the inventive example 1-3 (x=2: $Li_3YBr_4I_2$) as a typical behavior of the inventive example 1. Within the temperature range from −30° C. to 80° C., in all the inventive examples 1-1 to 1-7, no rapid change in conductivity indicating a phase change (i.e., phase transition) was observed.

The results shown in FIG. 7 were provided by the following method. The solid electrolyte materials of the inventive examples 1-1 to 1-7 which corresponded to a thickness of 700 µm were inserted into respective insulating outer cylinders. Each of the solid electrolyte materials was pressure-molded at a pressure of 40 MPa to provide solid electrolyte layers. Next, aluminum electrodes which corresponded to a thickness of 50 µm were stacked on the upper and lower surfaces of each of the solid electrolyte layers. Each of the solid electrolyte materials having the aluminum electrodes was pressure-molded at a pressure of 360 MPa to produce stacking structures. Next, stainless-steel current collectors were disposed on the upper and lower parts of each of the stacking structures, and current collector leads were attached to the current collectors. Finally, an insulating ferrule was used to block and seal the insides of the insulating outer cylinders from the outside atmosphere. The test bodies each including the stacking structure provided by the above method were put in a thermostatic chamber, and the temperature dependence of the ion conductivity was measured in a temperature rising process and a temperature falling process.

[Evaluation of Composition]

The solid electrolyte materials of the inventive example 1 were evaluated for the compositions thereof using ICP (Inductively Coupled Plasma) emission spectroscopy. As a result, in each of the inventive examples 1-1 to 1-7, deviation of LiN from its charged composition was within 3%. As a result, it can be said that the charged composition with the planetary ball mill was almost the same as the composition of the solid electrolyte material described in each of the inventive examples.

Hereinafter, a method for synthesizing and evaluating solid electrolytes used as a referential example and a comparative example will be described.

Comparative Example 1-1

In a glove box maintained in a dry and low-oxygen atmosphere with a dew point of −90° C. or less and an oxygen value of 5 ppm or less, raw material powders LiI and $YI_3$ were prepared in a molar ratio of $LiI:YI_3=3:1$. These were ground and mixed in a mortar. Subsequently, milling processing was performed at 600 rpm for 25 hours using a planetary ball mill.

As a result, $Li_3YI_6$ powder, which was the solid electrolyte material of the comparative example 1-1, was provided.

Except for the material synthesis described above, the solid electrolyte material of the comparative 1-1 was evaluated in the same manner as in the inventive example 1. The ion conductivity of $Li_3YI_6$ measured at 22° C. was $5.0\times10^{-5}$ S/cm.

<<Comparative example 1-2>>

In a glove box maintained in a dry and low-oxygen atmosphere with a dew point of −90° C. or less and an oxygen value of 5 ppm or less, raw material powders LiBr and $InBr_3$ were prepared in a molar ratio of $LiBrInBr_3=3:1$. These were ground and mixed in a mortar. Subsequently, the sample pressure-molded into a pellet was vacuum-sealed in a glass tube and sintered at 200° C. for 1 week.

As above, $Li_3InBr_6$, which was the solid electrolyte material of the comparative example 1-2, was provided.

Using the same method as in the inventive example 1, the ion conductivity and the phase transition of the solid electrolyte material of the comparative example 1-2 were evaluated. The ion conductivity measured at 22° C. was less than $1\times10^{-7}$ S/cm.

The temperature dependence of the ion conductivity of the solid electrolyte material of the comparative example 1-2 is shown in FIG. 7. As shown in FIG. 7, due to the temperature dependence of the conductivity, the conductivity changed suddenly around 55° C. during the temperature rising process. In other words, a phase change was observed in the solid electrolyte material of the comparative example 1-2.

<<Comparative example 1-3>>

LiCl and $FeCl_2$ were used as the raw material powders for the solid electrolyte, and mixed at a molar ratio of LiCl: $FeCl_2$=2:1.

As a result, $Li_2FeCl_4$, which was the solid electrolyte material of the comparative example 1-3, was provided.

Except for this, the ion conductivity of the solid electrolyte material of the comparative example 1-3 was evaluated in the same manner as in the inventive example 1. The measured ion conductivity was $8.7\times10^{-6}$ S/cm.

Reference Example 1-1

In a glove box maintained in a dry and low-oxygen atmosphere with a dew point of −90° C. or less and an oxygen value of 5 ppm or less, raw material powders LiBr and $YBr_3$ were prepared in a molar ratio of Li:Y:Br=3:1:6. These were ground and mixed in a mortar. Subsequently, milling processing was performed at 600 rpm for 25 hours using a planetary ball mill. In this way, $Li_3YBr_6$ powder, which was the solid electrolyte material of the reference example 1-1, was provided. The materials were evaluated in the same manner as in the inventive example 1, except for the material synthesis described above. The ion conductivity measured at 22° C. was $4.0\times10^{-4}$ S/cm.

Hereinafter, a method for producing and evaluating a secondary battery of $Li_3YBr_{6-x}I_x$ in the present example will be described below.

[Production of Coating Layer of Positive electrode Active Material]

In an argon glove box, 0.06 mg of metal Li (manufactured by Honjo Chemical Corporation) and 2.87 mg of pentaethoxyniobium (manufactured by Kojundo Chemical Laboratory Co., Ltd.) were dissolved in 0.2 mL of super-dehydrated ethanol (manufactured by FUJIFILM Wako Pure Chemical Corporation) to provide a coating solution.

In an agate mortar, stirring was performed while the provided coating solution was gradually added to 100 mg of $Li(NiCoAl)O_2$, which was the positive electrode active material.

After all the coating solution was added, stirring was performed on a hot plate at 30° C., until drying and solidification of all the coating solution were visually confirmed.

The dried and solidified powder was put in an alumina crucible and taken out in an air atmosphere.

Next, heat treatment was performed at 300° C. for 1 hour in an air atmosphere.

The powder after the heat treatment was reground in an agate mortar to provide a positive electrode active material of the inventive example 1 in which a coating layer was formed on its particle surface layer. In other words, a plurality of particles of the positive electrode active material were provided, and a coating layer was formed on at least a part of the particle surface of all or some of the plurality of the particles.

The material of the coating layer is $LiNbO_3$.

[Production of Secondary Battery]

In a glove box maintained in a dry and low-oxygen atmosphere with a dew point of −90° C. or less and an oxygen value of 5 ppm or less, the solid electrolyte material $Li_3YBr_{6-x}I_x$ of the inventive example 1 and $Li(NiCoAl)O_2$, which was the positive electrode active material having a particle surface coated with $LiNbO_3$, were prepared at a volume ratio of 30:70. These were mixed in an agate mortar to prepare a positive electrode mixture.

The solid electrolyte materials of the inventive example 1 each of which corresponded to a thickness of 700 μm, and 12.3 mg of the positive electrode mixture were stacked in this order in respective insulating outer cylinders. Each of the solid electrolyte materials was pressure-molded at a pressure of 360 MPa to provide a positive electrode and a solid electrolyte layer.

Next, in each of the insulating outer cylinders, a metal In (thickness: 200 μm) was stacked on the opposite side to the side which was in contact with the positive electrode of the solid electrolyte layer. Each of the insulating outer cylinders was pressure-molded at a pressure of 80 MPa to produce a stacking structure of the positive electrode, the solid electrolyte layer, and the negative electrode. Next, stainless-steel current collectors were disposed on the upper and lower parts of each of the stacking structures, and current collector leads were attached to the current collectors. Finally, an insulating ferrule was used to block and seal the insides of the insulating outer cylinders from the outside atmosphere.

Thus, the secondary batteries using the solid electrolytes of the inventive examples 1-1 to 1-7 were produced.

[Charge/Discharge Test]

Figure 8:
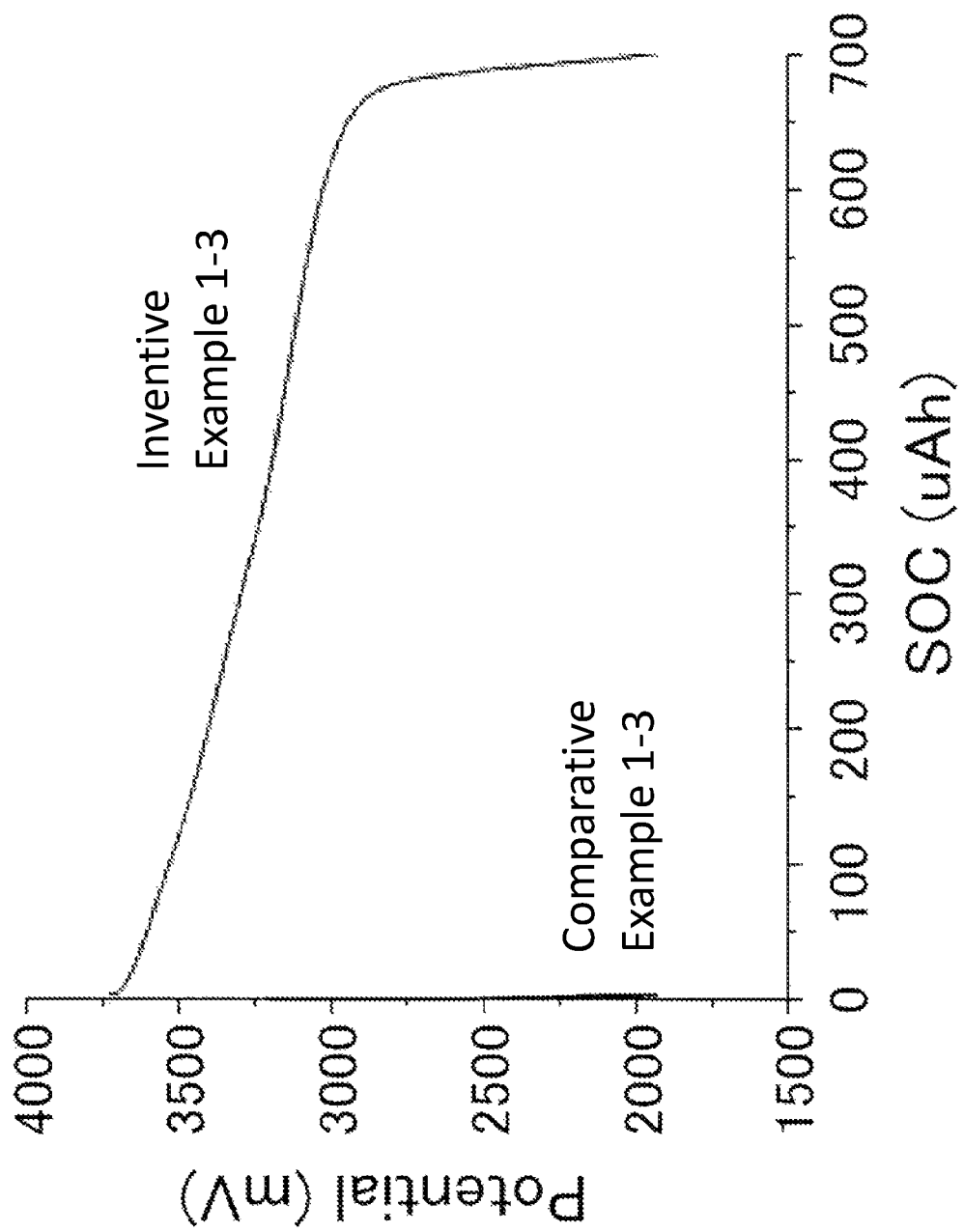
FIG. 8 is a graph showing an initial discharge characteristic.

FIG. 8 shows a graph of the inventive example 1-3 (x=2: $Li_3YBr_4I_2$) as a typical initial discharge characteristic.

The results shown in FIG. 8 were measured by the following method. In other words, the secondary batteries of the inventive examples 1 were disposed in a thermostatic chamber at 25° C. Constant-current charge was performed at a current value of 0.05 C rate (20 hour rate) with respect to theoretical capacity of each of the batteries, and the charge was terminated at a voltage of 3.7 V. Next, each of the batteries was discharged at a current value of 0.05 C rate, and the discharge was terminated at a voltage of 1.9 V. As the results of the measurements, the initial discharge capacities are shown in Table 1.

<<Discussion>>

As understood from the comparison of the inventive examples 1-1 to 1-7 to the comparative example 1-2, it can be seen that a phase transition does not occur in the solid electrolyte materials of the inventive examples within the range of −30° C. to 80° C., whereas a phase transition occurs in the comparative example 1-2. In other words, it can be seen that each of the solid electrolytes of the inventive examples 1-1 to 1-7 has a stable structure in the assumed operation temperature range of the battery.

In addition, as understood from the comparison of the inventive examples 1-1 to 1-7 to the comparative examples 1-1, 1-2, and 1-3, it can be seen that high ion conductivity of not less than $1\times10^{-4}$ S/cm is exhibited in the inventive examples 1-1 to 1-7 near room temperature, whereas ion conductivity of less than $1\times10^{-4}$ S/cm is exhibited in the comparative examples 1-1, 1-2, and 1-3. In addition, higher ion conductivity of not less than $7\times10^{-4}$ S/cm was observed in the inventive examples 1-2 to 1-4.

From the above, it is shown that the solid electrolyte material according to the present disclosure is an electrolyte material that does not generate hydrogen sulfide and can stably maintain high lithium ion conductivity. Further, it is shown that an all-solid battery which does not generate hydrogen sulfide and is excellent in the charge/discharge characteristic can be realized.

Inventive Example 2

Hereinafter, a method for synthesizing and evaluating a solid electrolyte in the present example will be described.

[Production of Solid Electrolyte Material]

In the inventive examples 2-1 to 2-7, the solid electrolyte materials synthesized in the inventive examples 1-1 to 1-7 were annealed, respectively, at 300° C. for 48 hours in an electric furnace put in a glove box maintained in a dry and low-oxygen atmosphere with a dew point of −90° C. or less and an oxygen value of 5 ppm or less.

[Structural Evaluation of Solid Electrolyte Material]

The solid electrolyte materials synthesized in the inventive examples 2-1 to 2-7 were evaluated by an X-ray diffraction method (XRD) in an environment where a dry atmosphere with a dew point value of −40° C. or lower was maintained. As a result, similar peak patterns were provided in all the materials synthesized as the inventive examples 2-1 to 2-7.

Figure 6:
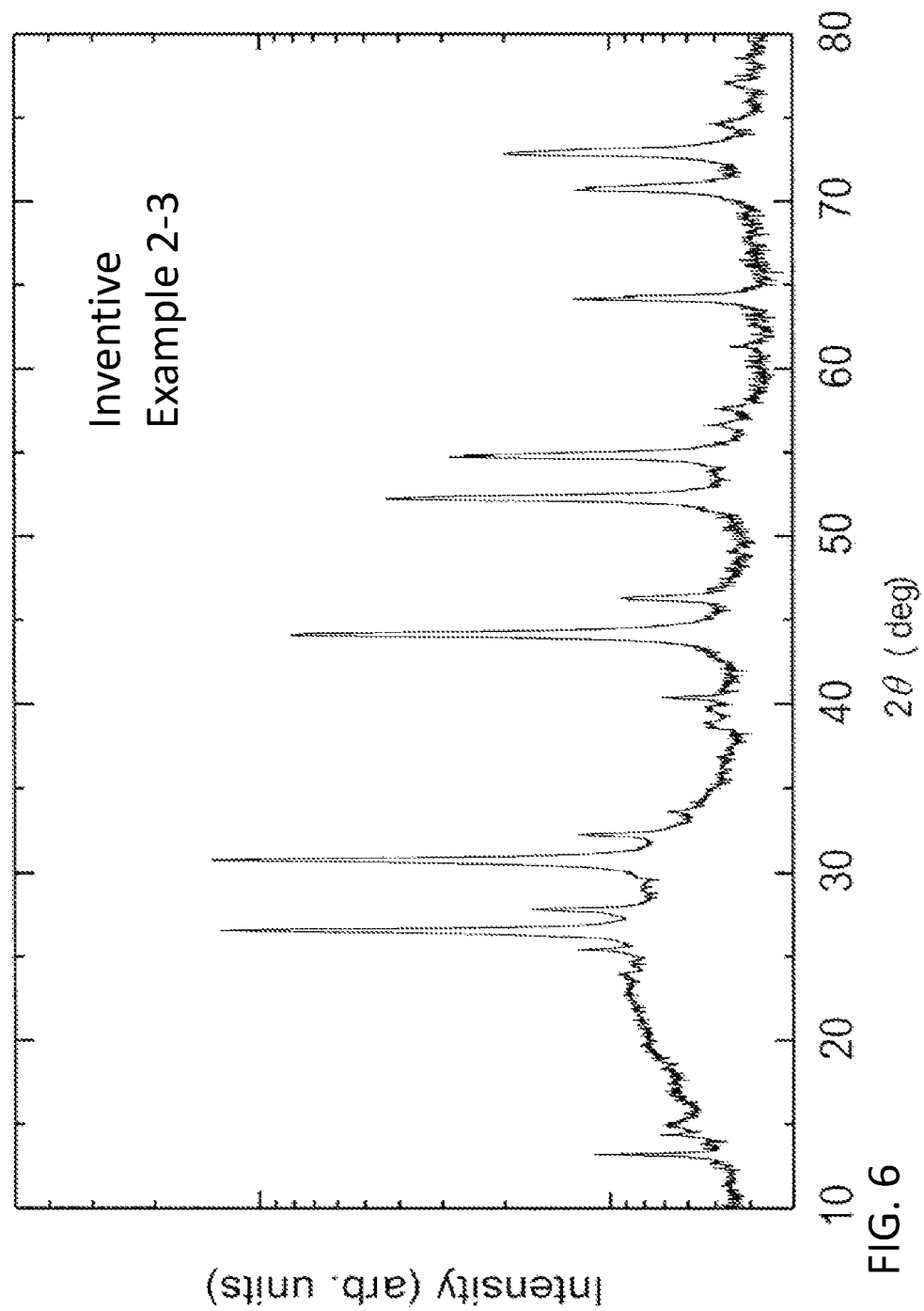
FIG. 6 is a diagram showing a peak pattern in an XRD of $Li_3YBr_4I_2$ which has been subjected to annealing.

As a typical XRD peak pattern of the inventive example 2, FIG. 6 shows the peak pattern of the inventive example 2-3, namely, the peak pattern of $Li_3YBr_4I_2$ (x=2).

The peaks observed in the inventive example 2-3 were sharper, and peaks that were not observed in the inventive example 1-3 were observed. This would be an effect of homogenization of the crystal structure due to the progress of crystallization by the annealing. In addition, little change in the positions of the peaks due to the annealing was observed.

[Evaluation of Ion Conductivity]

The ion conductivity of the solid electrolyte materials in the present example was measured by the same method as in the inventive example 1. The results are shown in Table 2 below.

TABLE 2

|  | Conductivity ($10^{-4}$ S/cm) | Initial Discharge Capacity (μAh) |
|---|---|---|
| Inventive Example 2-1 | 7.5 | 790 |
| Inventive Example 2-2 | 15.6 | 810 |
| Inventive Example 2-3 | 20.9 | 720 |
| Inventive Example 2-4 | 17.1 | 670 |
| Inventive Example 2-5 | 12.4 | 420 |
| Inventive Example 2-6 | 5.5 | 210 |
| Inventive Example 2-7 | 4.0 | 90 |

[Evaluation of Phase Transition]

The same method as in the inventive example 1 was used. Within the temperature range from −30° C. to 80° C., in all the inventive examples 2-1 to 2-7, no sudden change in the conductivity indicating a phase change (i.e., phase transition) was observed.

[Evaluation of Secondary Battery]

The secondary batteries were manufactured using the solid electrolyte materials of the inventive examples 2-1 to 2-7 in the same manner as in the inventive example 1. The results of the initial discharge capacities are shown in Table 2. Each of the batteries using the solid electrolyte materials described in the present example exhibited the charge/discharge operation of the battery at room temperature, similarly to the case in the inventive example 1.

<<Discussion>>

It can be seen that the solid electrolyte materials of the inventive examples 2-1 to 2-7 exhibit high ion conductivity of not less than $4 \times 10^{-4}$ S/cm.

From the above, it is shown that the solid electrolyte material according to the present disclosure is an electrolyte material that does not generate hydrogen sulfide and can stably maintain high lithium ion conductivity. Further, it is shown that an all-solid battery which does not generate hydrogen sulfide and is excellent in the charge/discharge characteristic can be realized.

Inventive Example 3

Hereinafter, a method for synthesizing and evaluating $Li_3Y(Br,Cl,I)_6$ in the present example will be described.

[Production of Solid Electrolyte Material]

In a glove box maintained in a dry and low-oxygen atmosphere with a dew point of −90° C. or less and an oxygen value of 5 ppm or less, raw material powders LiBr, $YBr_3$, LiCl, $YCl_3$, LiI, and $YI_3$ were prepared at a molar ratio of Li:Y:Cl:Br:I=3:1:1:m:n. In other words, $Li_3YCl_lBr_mI_n$ (l+m+n=6) was prepared. These were ground and mixed in a mortar. Subsequently, milling processing was performed at 600 rpm for 25 hours using a planetary ball mill.

In this way, the solid electrolyte materials of the inventive example 3 were provided. The values of l, m, and n of the inventive examples 3-1 to 3-9 are shown in Table 3.

TABLE 3

|  | Composition | XRD peak angles | Conductivity ($10^{-4}$ S/cm) (room temperature) | Phase transition (not more than 80° C.) |
|---|---|---|---|---|
| Inventive Example 3-1 | $Li_3YCl_3Br_2I$ | 13.727, 27.56, 32.01, 45.9, 54.41, 57.23 | 19.2 | None |
| Inventive Example 3-2 | $Li_3YCl_3BrI_2$ | 12.89, 26.24, 30.43, 43.29, 51.23, 54.03 | 10.1 | None |
| Inventive Example 3-3 | $Li_3YCl_2Br_3I$ | 13.32, 27.06, 31.76, 45.62, 53.26, 55.93 | 19.5 | None |
| Inventive Example 3-4 | $Li_3YCl_2Br_2I_2$ | 13.26, 26.76, 31.23, 44.85, 52.74, 55.36 | 33.0 | None |
| Inventive Example 3-5 | $Li_3YCl_2BrI_3$ | 13.2, 26.46, 30.7, 44.08, 52.22, 54.83 | 5.0 | None |
| Inventive Example 3-6 | $Li_3YClBr_4I$ | 13.35, 27.29, 31.48, 45.12, 53.54, 56.14 | 15.1 | None |
| Inventive Example 3-7 | $Li_3YClBr_3I_2$ | 13.22, 26.59, 30.8, 44.48, 52.63, 55.25 | 17.1 | None |
| Inventive Example 3-8 | $Li_3YClBr_2I_3$ | 12.92, 26.08, 30, 42.9, 51.05, 53.14 | 15.1 | None |
| Inventive Example 3-9 | $Li_3YClBrI_4$ | 12.89, 25.65, 29.91, 42.91, 50.7, 53.31 | 9.8 | None |

[Structural Evaluation of Solid Electrolyte Material]

The synthesized solid electrolyte materials were evaluated by an X-ray diffraction method (XRD) in an environment where a dry atmosphere with a dew point value of −40° C. or lower was maintained. As a result, XRD peak patterns from crystal planes composed of anions in the synthesized materials were provided. In addition, Table 3 shows the XRD peak angles provided in all the inventive examples 3-1 to 3-9.

[Evaluation of Ion Conductivity]

Using the configuration shown in FIG. 4, the ion conductivity was evaluated by the following method. In a glove box maintained in a dry and low-oxygen atmosphere with a dew point of −90° C. or less and an oxygen value of 5 ppm or less, the inside of the pressure-molding die 300 was filled with the powder of the solid electrolyte material of the inventive example 3 (example of the solid electrolyte particles 100). The powder was pressurized uniaxially at 400 MPa to produce a conductivity measurement cell of the inventive example 3. In a pressurized state, lead wires were routed from the upper punch part 303 and the lower punch part 302 and were connected to a potentiostat (Princeton Applied Research, VersaSTAT4) equipped with a frequency response analyzer. The ion conductivity at room temperature was measured by an electrochemical impedance measurement method. The ion conductivity of the solid electrolyte materials of the inventive example 3 measured at 22° C. is shown in Table 3.

[Evaluation of Phase Transition]

Figure 9:
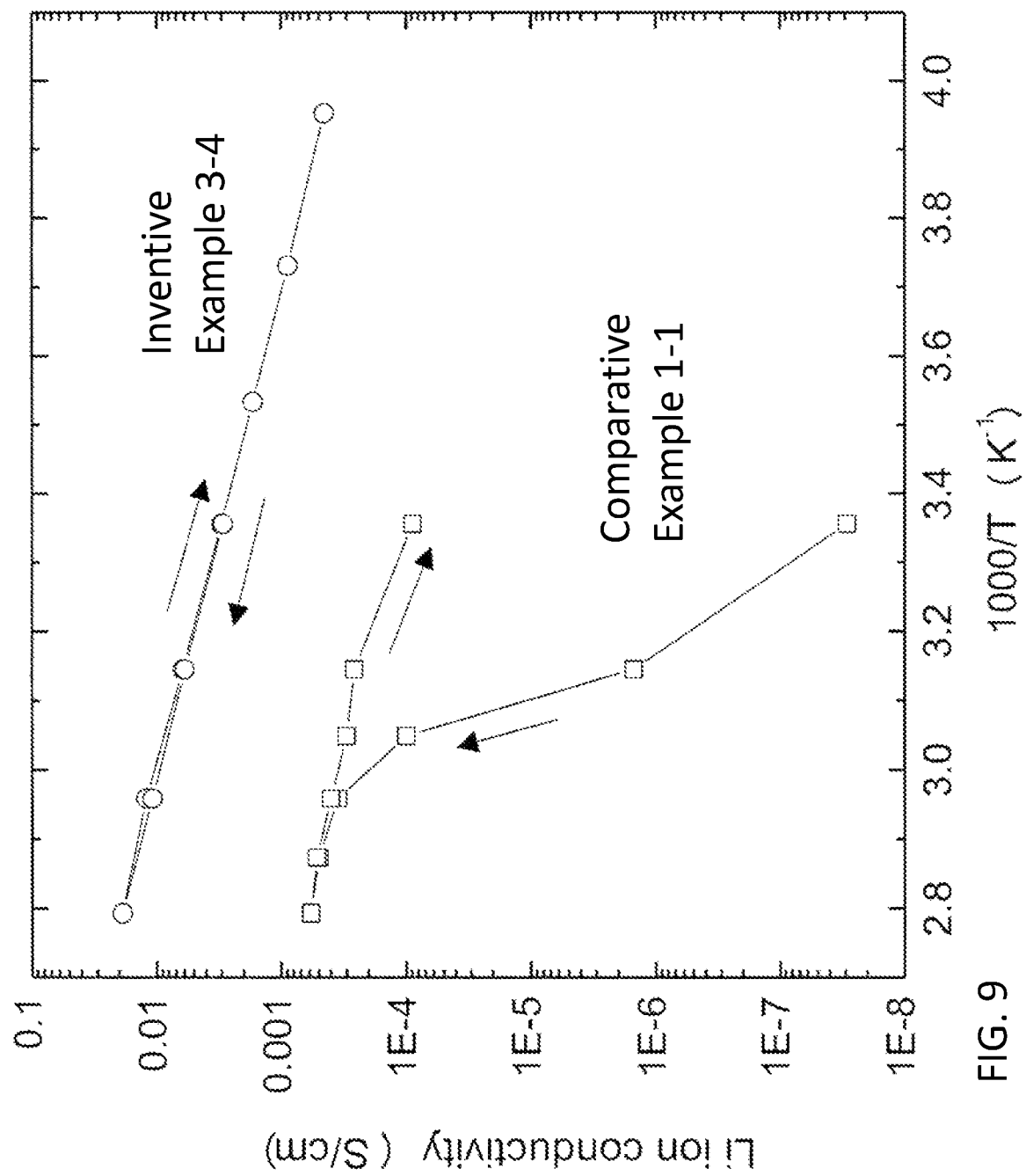
FIG. 9 is a graph showing temperature dependence of the ion conductivity of solid electrolytes.

FIG. 9 is a graph showing the temperature dependence of the ion conductivity of the solid electrolytes. FIG. 9 shows the measurement results of the inventive example 3-4 ($Li_3YBr_2Cl_2I_2$) as a typical behavior of the inventive example 3. Within the temperature range from −30° C. to 80° C., in all the inventive examples 3-1 to 3-9, no rapid change in conductivity indicating a phase change (i.e., phase transition) was observed.

The results shown in FIG. 9 were provided by the following method. The solid electrolyte materials of the inventive examples 3-1 to 3-9 which corresponded to a thickness of 700 μm were inserted into respective insulating outer cylinders. Each of the solid electrolyte materials was pressure-molded at a pressure of 40 MPa to provide solid electrolyte layers. Next, aluminum powder which corresponded to a thickness of 50 μm was stacked on the upper and lower surfaces of each of the solid electrolyte layers. Each of the solid electrolyte materials having the aluminum powder was pressured-molded at a pressure of 360 MPa to produce stacking structures. Next, stainless-steel current collectors were disposed on the upper and lower parts of each of the stacking structures, and current collector leads were attached to the current collectors. Finally, an insulating ferrule was used to block and seal the insides of the insulating outer cylinders from the outside atmosphere. The test bodies each including the stacking structure provided by the above method were put in a thermostatic chamber, and the temperature dependence of the ion conductivity was measured in a temperature rising process and a temperature falling process.

[Evaluation of Composition]

The solid electrolyte materials of the inventive example 3 were evaluated for the compositions thereof using the ICP (Inductively Coupled Plasma) emission spectroscopy. As a result, in each of the inventive examples 3-1 to 3-9, the deviation of LiN from its charged composition was within 3%. In other words, it can be said that the charged composition with the planetary ball mill was almost the same as the composition of the solid electrolyte material described in each of the inventive examples.

[Production of Coating Layer of Positive Electrode Active Material for Use in Production of Secondary Battery]

In an argon glove box, 0.06 mg of metal Li (manufactured by Honjo Chemical Corporation) and 2.87 mg of pentaethoxyniobium (manufactured by Kojundo Chemical Laboratory Co., Ltd.) were dissolved in 0.2 mL of super-dehydrated ethanol (manufactured by FUJIFILM Wako Pure Chemical Corporation) to provide a coating solution.

In an agate mortar, stirring was performed while the provided coating solution was gradually added to 100 mg of $Li(NiCoAl)O_2$, which was the positive electrode active material.

After all the coating solution was added, stirring was performed on a hot plate at 30° C., until drying and solidification of all the coating solution were visually confirmed.

The dried and solidified powder was put in an alumina crucible and taken out in an air atmosphere.

Next, heat treatment was performed at 300° C. for 1 hour in an air atmosphere.

The powder after the heat treatment was reground in an agate mortar to provide a positive electrode active material of the inventive example 3 in which a coating layer was formed on the particle surface layer. In other words, a plurality of particles of the positive electrode active material were provided, and a coating layer was formed on at least a part of the particle surface of all or some of the plurality of the particles. The material of the coating layer is $LiNbO_3$.

[Production of Secondary Battery]

Hereinafter, the production and evaluation methods for the secondary batteries in the present example will be described.

In a glove box maintained in a dry and low-oxygen atmosphere with a dew point of −90° C. or less and an oxygen value of 5 ppm or less, the solid electrolyte material $Li_3YCl_lBr_mI_n$ of the inventive example 3 and $Li(NiCoAl)O_2$, which was the positive electrode active material having the particle surface coated with $LiNbO_3$, was prepared at a volume ratio of 30:70. These were mixed in an agate mortar to produce a positive electrode mixture.

The solid electrolyte materials of the inventive example 3 each of which corresponded to a thickness of 700 μm, and 12.3 mg of the positive electrode mixture were stacked in this order in respective insulating outer cylinders. Each of the solid electrolyte materials was pressure-molded at a pressure of 360 MPa to provide a positive electrode and a solid electrolyte layer.

Next, in each of the insulating outer cylinders, a metal In (thickness: 200 μm) was stacked on the opposite side to the side which was in contact with the positive electrode of the solid electrolyte layer. Each of the solid electrolyte materials having the positive electrode and the metal In were pressure-molded at a pressure of 80 MPa to produce a stacking structure of the positive electrode, the solid electrolyte layer, and the negative electrode.

Next, stainless-steel current collectors were disposed on the upper and lower parts of each of the stacking structures, and current collector leads were attached to the current collectors. Finally, an insulating ferrule was used to block and seal the insides of the insulating outer cylinders from the outside atmosphere.

Thus, the secondary batteries using the materials of the inventive example 3 were produced.

[Charge/Discharge Test]

Figure 10:
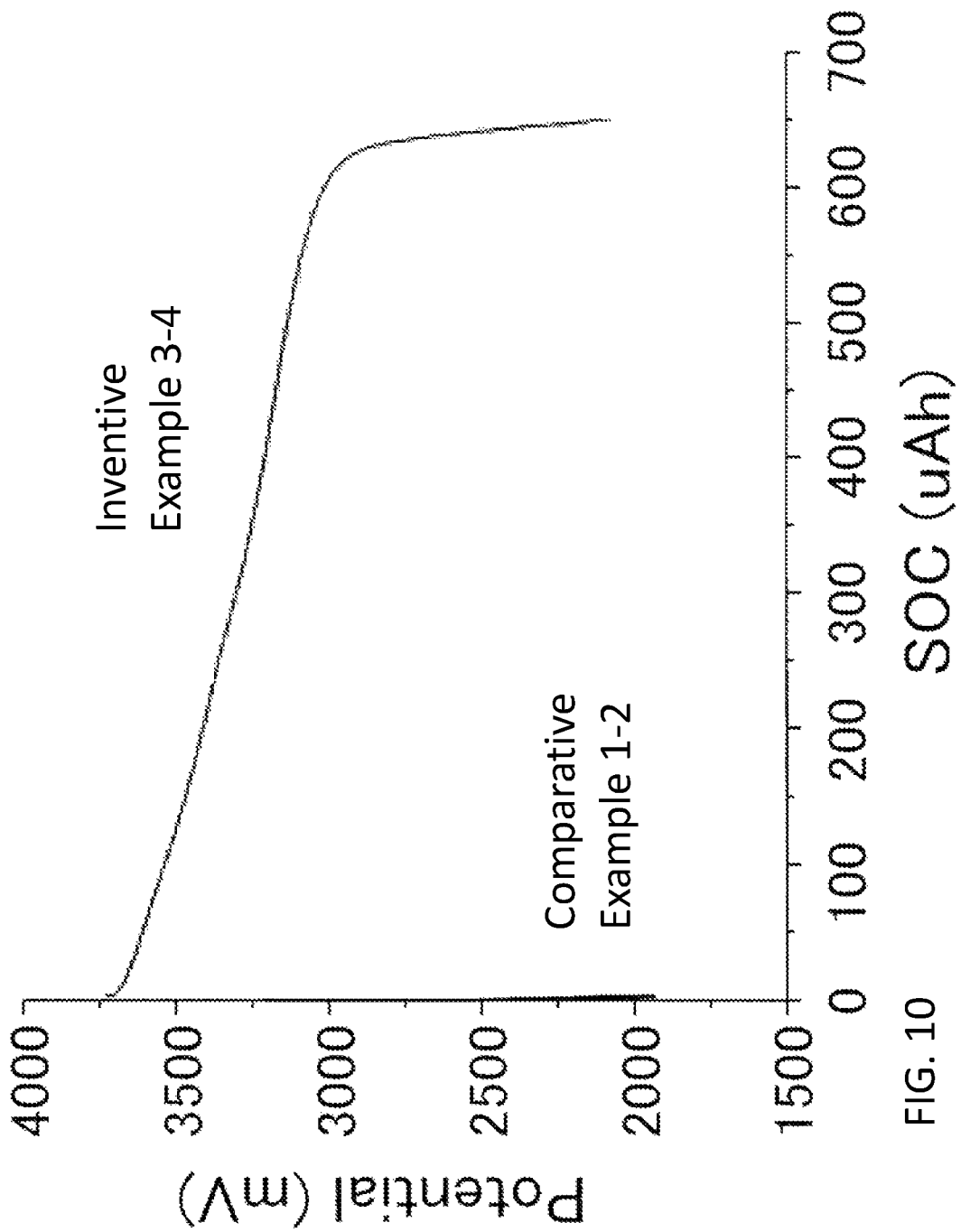
FIG. 10 is a graph showing an initial discharge characteristic.

FIG. 10 shows a graph of the inventive example 3-4 (l=m=n=2: $Li_3YCl_2Br_2I_2$) as a typical initial discharge characteristic. The results shown in FIG. 10 were provided by the following method. In other words, the secondary batteries of the inventive examples 3 were disposed in a thermostatic chamber at 25° C. Constant-current charge was performed at a current value of 0.05 C rate (20 hour rate) with respect to theoretical capacity of each of the batteries, and the charge was terminated at a voltage of 3.7 V. Next, each of the batteries was discharged at a current value of 0.05 C rate, and the discharge was terminated at a voltage of 1.9 V. In FIG. 10, in the inventive example 3-4, an initial discharge capacity of 650 pAh was provided. Using the above method, the same measurements were performed in all the inventive examples 3-1 to 3-9. A good discharge capacity was provided in each of the inventive examples 3-1 to 3-3 and 3-5 to 3-9, similarly to that of the inventive example 3-4.

<<Discussion>>

As understood from the comparison of the inventive examples 3-1 to 3-9 to the comparative example 1-2, it can be seen that no phase transition occurs in the solid electrolytes of the present examples within the range of −30° C. to 80° C., whereas a phase transition occurs in the solid electrolyte of the comparative example 1-2. In other words, it can be seen that each of the solid electrolytes of the inventive examples 3-1 to 3-9 has a stable structure in the assumed operation temperature range of the battery.

In addition, in each of the solid electrolyte materials of the present inventive example, the charge/discharge operation of the battery was observed at room temperature. On the other hand, as shown in FIG. 8 and FIG. 10, in the comparative examples 1-2 and 1-3, the discharge capacity was hardly provided, and the battery operation failed to be observed.

From the above, it is shown that the solid electrolyte material according to the present disclosure is an electrolyte material that does not generate hydrogen sulfide and can stably maintain high lithium ion conductivity. Further, it is shown that an all-solid battery which does not generate hydrogen sulfide and is excellent in the charge/discharge characteristic can be realized.

INDUSTRIAL APPLICABILITY

The battery of the present disclosure can be used as, for example, an all-solid lithium secondary battery.

REFERENTIAL SIGNS LIST

100 Solid electrolyte particles
201 Positive electrode
202 Electrolyte layer
203 Negative electrode
204 Positive electrode active material particles
205 Negative electrode active material particles
300 Pressure-molding die
301 Frame
302 Lower punch part
303 Upper punch part
1000 Battery

The invention claimed is:

1. A solid electrolyte material comprising:
Li, Y, Br, and I,
wherein
in an X-ray diffraction pattern in which Cu-Kα is used as a radiation source, peaks are present within all ranges of diffraction angles 2θ of 12.5° to 14.0°, 25.0° to 27.8°, 29.2° to 32.3°, 41.9° to 46.2°, 49.5° to 54.7°, and 51.9° to 57.5°.

2. The solid electrolyte material according to claim 1, wherein
in the X-ray diffraction pattern in which the Cu-Kα is used as the radiation source, the peaks are present within all ranges of the diffraction angles 2θ of 12.5° to 14.0°, 25.0° to 27.4°, 29.2° to 31.6°, 41.9° to 45.1°, 49.5° to 53.4°, and 51.9° to 56.1°.

3. The solid electrolyte material according to claim 2, wherein
in the X-ray diffraction pattern in which the Cu-Kα is used as the radiation source, the peaks are present within all ranges of the diffraction angles 2θ of 12.9° to 13.5°, 26.1° to 27.1°, 30.2° to 31.3°, 43.4° to 44.9°, 51.4° to 53.2°, and 53.8° to 55.8°.

4. The solid electrolyte material according to claim 1, further comprising:
Cl,
wherein
in the X-ray diffraction pattern in which the Cu-Kα is used as the radiation source, the peaks are present within all ranges of the diffraction angles 2θ of 12.6° to 14.0°, 25.4° to 27.8°, 29.7° to 32.3°, 42.6° to 46.2°, 50.4° to 54.7°, and 53.0° to 57.5°.

5. A battery, comprising:
a positive electrode;
a negative electrode; and
an electrolyte layer provided between the positive electrode and the negative electrode,
wherein
at least one selected from the group consisting of the positive electrode, the negative electrode, and the electrolyte layer includes the solid electrolyte material according to claim 1.

6. The battery according to claim 5, wherein the positive electrode includes a particle formed of a positive electrode active material; and
the particle is coated with an oxide at least partially.

7. The battery according to claim 6, wherein
the positive electrode active material is $Li(NiCoAl)O_2$.

8. The battery according to claim 6, wherein
the oxide is $LiNbO_3$.

* * * * *